(12) United States Patent
Din

(10) Patent No.: US 6,754,631 B1
(45) Date of Patent: Jun. 22, 2004

(54) RECORDING MEETING MINUTES BASED UPON SPEECH RECOGNITION

(75) Inventor: Salah U. Din, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/185,853

(22) Filed: Nov. 4, 1998

(51) Int. Cl.[7] ............................................. G10L 21/00
(52) U.S. Cl. ....................................... 704/270; 704/275
(58) Field of Search ................................. 704/270, 275

(56) References Cited

U.S. PATENT DOCUMENTS

| | | | | |
|---|---|---|---|---|
| 4,831,653 | A | | 5/1989 | Katayama ..................... 381/43 |
| 4,949,382 | A | | 8/1990 | Griggs ......................... 381/44 |
| 4,985,929 | A | | 1/1991 | Tsuyama ..................... 382/48 |
| 5,491,743 | A | * | 2/1996 | Shiio et al. .................. 709/204 |
| 5,500,920 | A | * | 3/1996 | Kupiec ........................ 704/270 |
| 5,526,407 | A | * | 6/1996 | Russell et al. ........... 379/88.01 |
| 5,598,507 | A | | 1/1997 | Kimber et al. .............. 395/255 |
| 5,687,287 | A | | 11/1997 | Gandhi et al. ............. 395/256 |
| 5,721,827 | A | * | 2/1998 | Logan et al. .......... 395/200.47 |
| 5,729,741 | A | * | 3/1998 | Liaguno et al. ............. 395/615 |
| 5,734,793 | A | * | 3/1998 | Wang .......................... 704/231 |
| 5,752,227 | A | | 5/1998 | Lyberg ....................... 704/235 |
| 5,774,857 | A | | 6/1998 | Newlin ....................... 704/271 |
| 5,810,599 | A | * | 9/1998 | Bishop ....................... 434/157 |
| 5,818,800 | A | * | 10/1998 | Barker ......................... 369/25 |
| 5,855,000 | A | * | 12/1998 | Waibel et al. .............. 704/235 |
| 5,870,755 | A | * | 2/1999 | Stevens et al. ............. 707/104 |
| 5,883,986 | A | * | 3/1999 | Kopec et al. ............... 382/310 |
| 5,884,256 | A | * | 3/1999 | Bennett et al. ............. 704/235 |
| 5,949,952 | A | * | 9/1999 | Bennett et al. ............... 386/46 |
| 5,960,399 | A | * | 9/1999 | Barclay et al. ............. 704/270 |
| 5,991,723 | A | * | 11/1999 | Duffin ........................ 704/260 |
| 5,995,936 | A | * | 11/1999 | Brais et al. ................. 704/275 |
| 6,100,882 | A | * | 8/2000 | Sharman et al. ........... 704/235 |
| 6,457,043 | B1 | * | 9/2002 | Kwak et al. ................ 709/204 |

* cited by examiner

Primary Examiner—Doris H. To
Assistant Examiner—Michael N. Opsasnick
(74) Attorney, Agent, or Firm—Scott Charles Richardson; Walter J. Malinowski; Suiter-West PC LLO

(57) ABSTRACT

A method and system for memorializing a conversation of a plurality of speakers are disclosed. A sample utterance of each of the plurality of speakers is sampled thereby producing a file of sample utterances each having a characteristic corresponding to one of the speakers. A characteristic of the sample utterances is associated with the corresponding speaker, and the conversation is recorded and saved to a storage medium. A speaker is identified by matching the characteristic of the sample utterance with the conversation utterance, and information regarding the identified speaker is associated with the conversation utterances. A transcript of the conversation is generated that includes information regarding the speaker with a corresponding utterance.

32 Claims, 4 Drawing Sheets

US 6,754,631 B1

RECORDING MEETING MINUTES BASED UPON SPEECH RECOGNITION

FIELD OF THE INVENTION

The present invention generally relates to the field of information handling systems, and particularly to memorialization of conversations.

BACKGROUND OF THE INVENTION

In the modern business environment, it is often desirable to memorialize conversations and meetings for later referral and for record keeping purposes. Typically, the audio portion of a conversation is recorded onto magnetic tape with a tape recorder, or video and audio portions of a conversation may be recorded in instances where it is desired to memorialize visual aspects of a meeting. Often, a scribe or secretary may be present at the meeting to manually capture the conversation to create a text transcript of the meeting. This is done to further the objective of associating speakers with uttered passages of conversation so that a person reading the transcript at a later time would be able to better understand the conversation by knowing which speaker spoke which utterances. However, using a human being to create a transcript in real time is inefficient and results in errors since conversations typically occur at a greater rate than the rate at which a human being can write down or type the conversation information. Problems increase when the person doing the transcribing is required to participate in the conversation. In addition, an operator is required to operate recording equipment such as microphones and video cameras requiring an additional human being who is not able to fully participate in the conversation while operating the equipment. Thus, there lies a need for a system that is capable of automatically recording and transcribing a meeting and which is further capable of automatically operating meeting recording devices.

SUMMARY OF THE INVENTION

The present invention is directed to a method for memorializing a conversation of a plurality of speakers. In one embodiment, the method includes steps for sampling a sample utterance of each of the plurality of speakers thereby producing a plurality of sample utterances each having a characteristic corresponding to a corresponding one of the plurality of speakers, associating a characteristic of the sample utterances with the corresponding one of the plurality of speakers, recording the conversation by saving the conversation to a storage medium as the conversation occurs whereby conversation utterances generated by each of the plurality of speakers during the conversation are saved to the storage medium, identifying the one of the plurality of speakers who generated each one of the conversation utterances by matching the characteristic of the sample utterance associated with the corresponding one of the plurality of speakers with a characteristic of the conversation utterance, and associating information regarding the identified speaker with at least one of the conversation utterances.

The present invention is further directed to an information handling system for memorializing a conversation of a plurality of speakers. In one embodiment, the information handling system includes a processor for executing a program of instructions on the information handling system, a memory coupled to the processor for storing the program of instructions executed by the processor, and a transducer coupled to the information handling system and controlled by the processor for converting utterances of the plurality of speakers into a signal interpretable by the information handling system wherein the information handling system generates a transcript of the conversation, the transcript including information associated with each of the utterances, the information regarding the corresponding speaker of each utterance.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
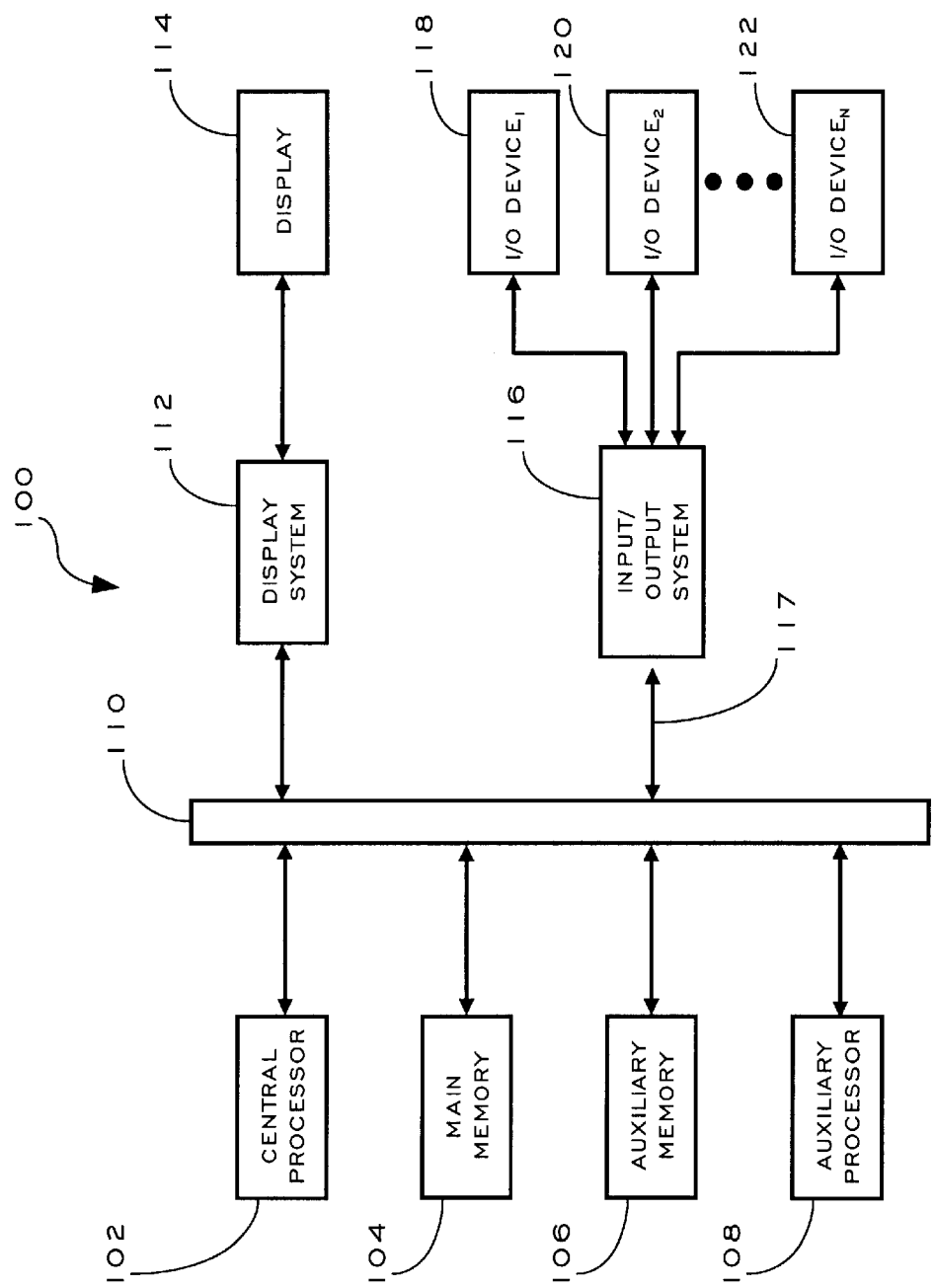
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, a peripheral bus 117 may be coupled with bus 110 and may be compliant with any promulgated industry standard. For example, bus 117 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be, for example, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including USB, Fire Wire 1394, IEEE 1394 Serial Bus, Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
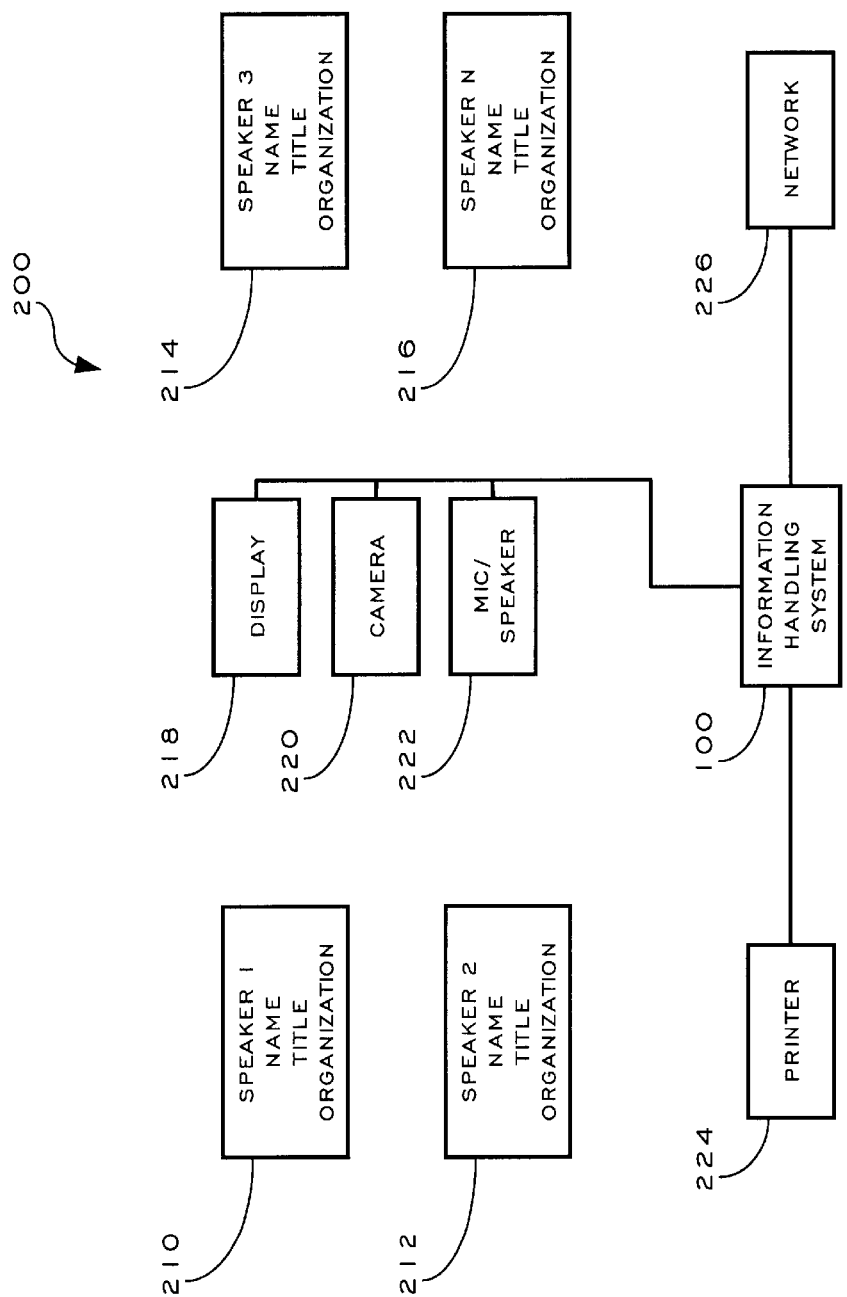
FIG. 2 is a block diagram of a system for recording a conversation in accordance with the present invention.

Referring now to FIG. 2, a block diagram of a system for recording a conversation in accordance with the present invention will be discussed. The system 200 includes information handling system 100 as discussed with respect to FIG. 1 for receiving, processing and storing a recorded conversation. A microphone or microphone and speaker apparatus 222 are coupled to an input of information handling system for transducing audio signals generated by one or more speakers 210, 212, 214, up to N number of speakers 216, taking part in the conversation. Information handling system 100 is configured to receive the audio signals captured by microphone 222, process the signals in an appropriate format (e.g., analog, digital, encoded audio formats, compressed audio formats, etc.), and store the signals on an appropriate storage medium (e.g., magnetic tape, auxiliary memory 106, etc.). Apparatus 222 may include merely a microphone, a microphone that may also function as a speaker, or may include both an individual microphone and an individual speaker, for example. Apparatus 222 may provide a speaker function in order to play back portions or all of the conversation recorded by system 200 with information handling system 100. A camera 220 may also be coupled to information handling system 100 to record the video information of the conversation in a video format that is received, processed and stored by information handling system 100. Display 218 may be coupled to information handling system 100 to display information regarding the recording of conversation, for example for controlling operation of information handling system 100 or for playing back video information captured by information handling system via camera 220. Each of the speakers 210216 may have specific information regarding the speaker that is desired to be integrated with the conversation as it is recorded. For example, when a conversation of a meeting is recorded by system 200, it may be desirable to generate a text transcript of the conversation which may be accomplished by utilizing a program executing on information handling system 100 that converts audio speech information into written text. When the transcript is read, the reader would be assisted in understanding the transcript if the reader could identify which of the speakers was associated with specific passages in the transcript. This information is integrated into the transcript by information handling system 100. For example, the name, title, and or organization of a given speaker may be provided at the beginning of the passage of text in the transcript corresponding to the speaker's conversation utterances. For the first appearance of the speaker in the transcript, all relevant information regarding the speaker may be provided, and for subsequent appearances only the speaker's name may be provided. Furthermore, a video recording of the conversation may be generated by information handling system 100 such that the conversation may be memorialized in an audio format, a text format, a video format, or any combination thereof. The term transcript as utilized herein is intended to include any form in which the conversation information is memorialized or reproduced, including but not limited to audio, text, video, printed, electronic, magnetic, optical, analog, digital, etc. Information handling system 100 may provided a print out of the transcript to a printer 224 such that the conversation may be subsequently reviewed by reading the print out. Additionally, the transcript may be transmitted over a network 226 to a desired location, for example in real time or after completion of the conversation, such that the conversation or a transcript of the conversation is available to other individuals or information handling systems via network 226.

During the course of the conversation as it is captured and recorded by information handling system 100, a parameter of a device of system 200 may be adjusted or optimized. For example, camera 220 may be mounted on a stand that allows for the camera direction to be adjusted and a zoom or focus mechanism to be adjusted such as with servomotors. Information handling system 100 may be configured to control camera 220 such that, when a speaker generating a conversation utterance is identified, camera 220 may be directed toward the uttering speaker to optimally capture the image of the speaker, to provide optimal focus, to provide optimal contrast, etc. When a second speaker begins uttering, camera 220 may then be likewise readjusted to optimally capture a video image of the second speaker, and so on. Similarly, microphone 222 may be controlled by information handling system 100 to optimize audio recording of a given uttering speaker. For example, Speaker1 210 may be closer to microphone 222 or may speak in a louder voice than Speaker3 214. When Speaker1 210 is identified as the uttering speaker, microphone 222 may be adjusted to a lower gain level, and when Speaker3 214 is identified as the uttering speaker, microphone 222 may be adjusted to a higher gain level to compensate for volume differences in the respective utterances of Speaker1 210 and Speaker3 214.

As a specific application of system 200 may be an official meeting such as a business meeting, organization meeting, governmental body meeting, or any similar type of meeting for which recording and memorializing of a conversation is of great importance. In the event the conversation occurs during such a meeting, system 200 records the conversation occurring during the meeting and generates a transcript with information handling system 100. From the generated transcript, information handling system 100 implements steps for generating minutes of the meeting, action items and an agenda for a subsequent meeting. The generated minutes, action items and agenda may be reproduced and immediately reviewed or may be stored and retrieved at a time subsequent to the meeting. For example, the minutes, action items and agenda may be printed by printer 224, displayed on display 218, transmitted over network 226, or stored locally in a memory or on a storage medium of information handling system 100. System 200 may further implement steps for scheduling a subsequent meeting (e.g., date, time, place, location), for providing an agenda for the subsequent meeting, for providing a reminder of the scheduled meeting to each of the speakers, and for providing an action item to each one of the speakers. The action item sent to a given speaker preferably includes information pertaining specifically to the corresponding speaker.

Figure 3:
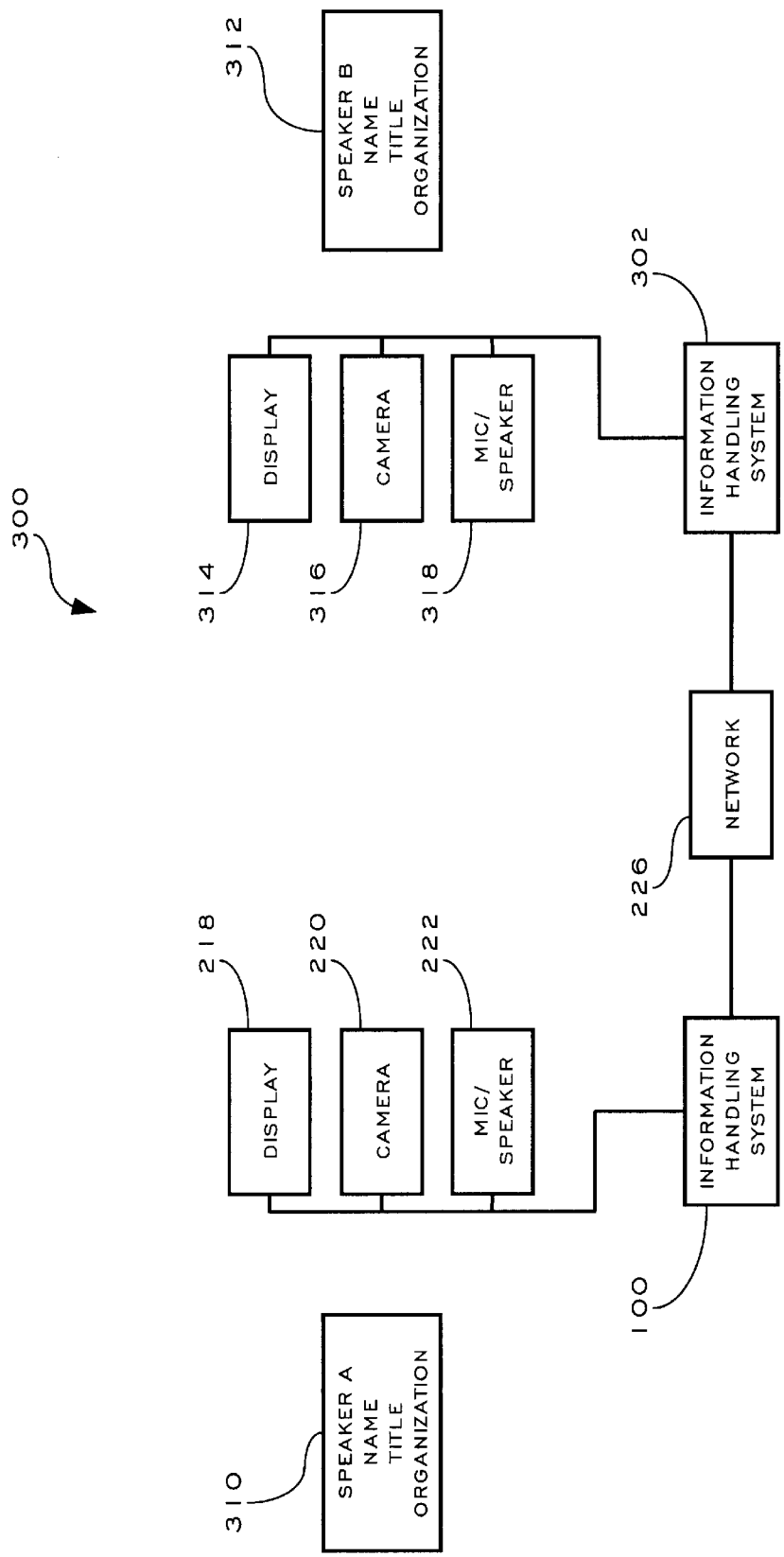
FIG. 3 is a block diagram of a system for recording a conversation over a network in accordance with the present invention.

Referring now to FIG. 3, a block diagram of a system for recording a conversation over a network in accordance with the present invention will be discussed. The system 300 of FIG. 3 illustrates the recording of a conversation of one or more speakers 310 and 312 over a network 226. System 300 is essentially identical to system 200 of FIG. 2 with the added feature that system 300 illustrates the recording of the conversations of speakers 310 and 312 over network 226. Thus, SpeakerA 310 and SpeakerB 312 need not be in the same room as one another since system 300 links speakers 310 and 312 over a network. Thus, SpeakerA 310 may be located in California while SpeakerB 312 may be located in New York. Network 226 may be the Internet, for example, for allowing such a distant coupling of speakers. Information handling system 100 along with display 218, camera 220 and mic/speaker 222 may be proximal to SpeakerA 310 while information handling system 302 along with display 314, camera 316 and mic/speaker 318 may be proximal to SpeakerB 312. Thus, a conversation between speakers 310 and 312 may be recorded as discussed with respect to FIG. 2. For example, as SpeakerA 310 is generating conversation utterances, the conversation utterances may be captured and converted into a transcript that is transmitted to information handling system 302 and displayed on display 314 for viewing by SpeakerB 312. Additionally, more than two speakers may be similarly coupled via network 226 such that a conversation of the more than two speakers may be recorded while each of the two or more speakers are located in a different location. System 300 may provide a transcript of the conversation may be provided to each of the more than two speakers.

Figure 4:
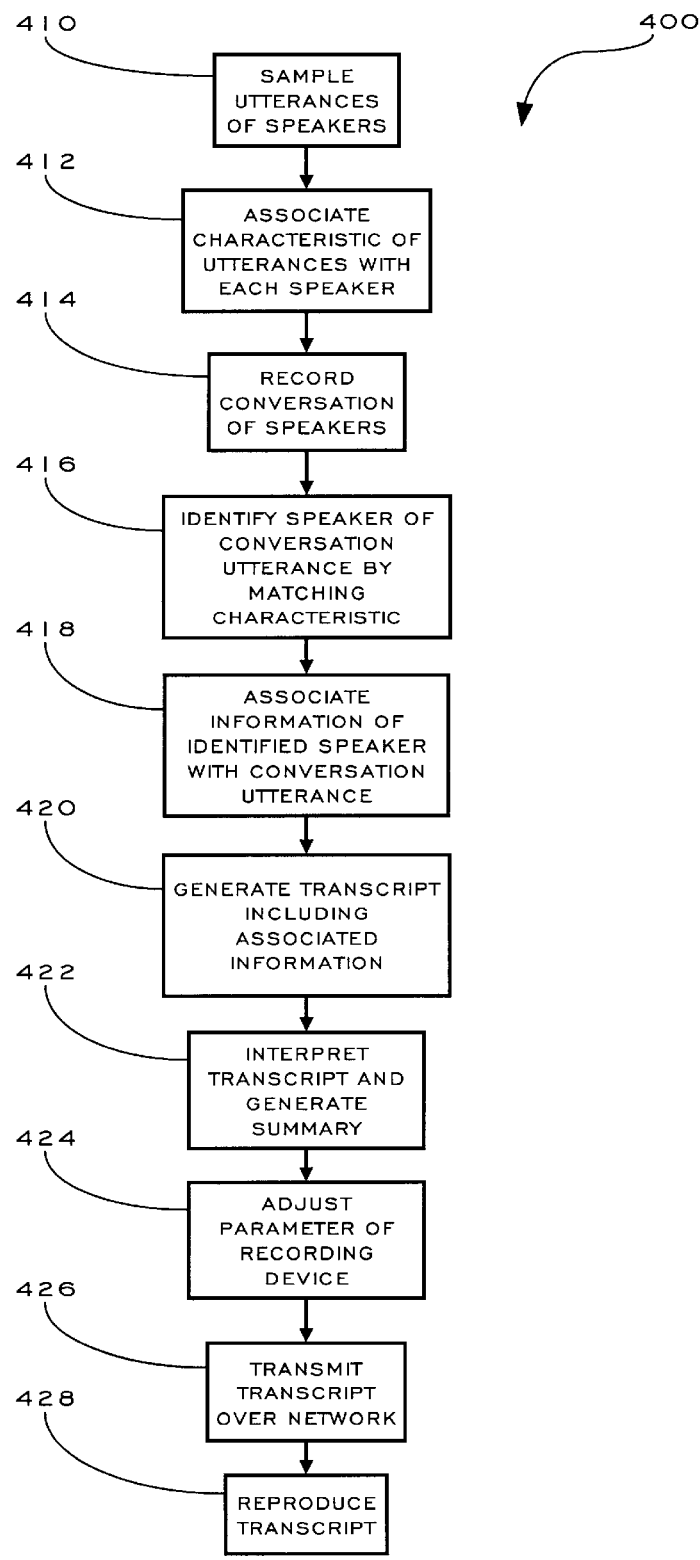
FIG. 4 is a flow diagram of a method for memorializing a conversation in accordance with the present invention.

Referring now to FIG. 4, flow diagram of a method for memorializing a conversation in accordance with the present invention will be discussed. The method 400 begins with the step of sampling a sample utterance of each of the speakers at step 410. Each of the utterances of each corresponding speaker will thereby include a characteristic of the speech patterns of the corresponding speaker, and all of the utterances may be stored in a sample utterances file. The characteristics of the sample utterances are associated with each of the corresponding speakers at step 412 such that the speaker of a future utterance may be identified by comparing the future utterance with the sample utterances based upon the associated characteristics. Recording of the conversation may subsequently occur at step 414. During the recording of the conversation, the identity of a speaker in the conversation may be determined at step 416 by matching a conversation utterance with the characteristic of a sample utterance such that the speaker is identified when a sample utterance matches the conversation utterance. The identified speaker is the speaker associated with the matched sample utterance. Upon identification of the speaker of a conversation utterance, information regarding the identified speaker is associated with the conversation utterance at step 418. The information regarding the identified speaker may include the speaker's identity, name, title, organization, status, etc. A transcript of the conversation may be generated subsequently at step 420 by including the associated information within the transcript. The transcript of the conversation may be interpreted at step 422 such that information based upon the content of the conversation may be generated. For example, the conversation may be interpreted such that a summary of the conversation is generated. During the recording process, a parameter of a recording device or apparatus may be adjusted at step 424 according to speaker identified by identifying step 416. For example, camera 316 may be directed with automatic controls (e.g., motors) to specifically capture the image of the identified speaker. As a further example, the gain of microphone 222 may be adjusted to normalize the level of the identified speaker's voice to a predetermined level in order to compensate for any voice level variance from speaker to speaker. The transcript of the conversation may be transmitted at step 426 over a network to a remote device or user coupled to the network. The transcript may be reproduced at step 428 by a peripheral device or system. For example, the transcript may be printed out by printer 224, displayed on display 218 or audibly reproduced by speaker 222.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and system for recording meeting minutes based upon speech recognition of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for memorializing a conversation of a plurality of speakers, comprising:

sampling a sample utterance of each of the plurality of speakers thereby producing a plurality of sample utterances each having a characteristic corresponding to a corresponding one of the speakers;

associating a characteristic of the sample utterances with the corresponding one of the plurality of speakers;

recording the conversation by saving the conversation to a storage medium as the conversation occurs whereby conversation utterances generated by each of the plurality of speakers during the conversation are saved to the storage medium;

identifying the one of the plurality of speakers who generated each one of the conversation utterances by matching the characteristic of the sample utterance associated with the corresponding one of the plurality of speakers with a characteristic of the conversation utterance;

associating information regarding the identified speaker with at least one of the conversation utterances;

generating a transcript of the conversation, the transcript including the information associated with the at least one of the conversation utterances; and interpreting the transcript of the conversation and generating a summary of the conversation based upon said interpreting the transcript.

2. A method as claimed in claim 1, further comprising the step of displaying the generated transcript on a display.

3. A method as claimed in claim 1, further comprising the step of transmitting the generated transcript over a network.

4. A method as claimed in claim 1, further comprising the step of adjusting a parameter of a recording device in response to said identifying step whereby recording of the conversation utterances generated by the identified one of the plurality of speakers is optimized.

5. A method as claimed in claim 4, said adjusting step including directing a video input device to capture the image of the identified one of the plurality of speakers.

6. A method as claimed in claim 4, said adjusting step including adjusting a gain parameter of a microphone proximal to the identified one of the plurality of speakers.

7. A method as claimed in claim 1, wherein the conversation occurs during a meeting, further comprising steps for generating minutes of the meeting, action items and an agenda for a subsequent meeting.

8. A method as claimed in claim 1, wherein the conversation occurs during a meeting, further comprising steps for scheduling a subsequent meeting, providing an agenda for the subsequent meeting, providing a reminder of the meeting to the plurality of speakers, and providing an action item to each one of the plurality of speakers, the action item pertaining specifically to the corresponding one of the plurality of speakers.

9. The method of claim 1, the information including the identified speaker's name and at least one of the group consisting of the identified speaker's title, organization, and status.

10. A program of instructions storable on a medium readable by an information handling system for causing the information handling system to execute steps for memorializing a conversation of a plurality of speakers, the steps comprising:

sampling a sample utterance of each of the plurality of speakers thereby producing a plurality of sample utterances each having a characteristic corresponding to a corresponding one of the plurality of speakers;

associating a characteristic of the sample utterances with the corresponding one of the plurality of speakers;

recording the conversation by saving the conversation to a storage medium as the conversation occurs whereby conversation utterances generated by each of the plurality of speakers during the conversation are saved to the storage medium;

identifying the one of the plurality of speakers who generated each one of the conversation utterances by matching the characteristic of the sample utterance associated with the corresponding one of the plurality of speakers with a characteristic of the conversation utterance;

associating information regarding the identified speaker with at least one of the conversation utterances;

generating a transcript of the conversation, the transcript including the information associated with the at least one of the conversation utterances; and interpreting the transcript of the conversation and generating a summary of the conversation based upon said interpreting the transcript.

11. A program of instructions as claimed in claim 11, the steps further comprising the step of displaying the generated transcript on a display.

12. A program of instructions as claimed in claim 11, the steps further comprising the step of transmitting the generated transcript over a network.

13. A program of instructions as claimed in claim 10, the steps further comprising the step of adjusting a parameter of a recording device in response to said identifying step whereby recording of the conversation utterances generated by the identified one of the plurality of speakers is optimized.

14. A program of instructions as claimed in claim 13, said adjusting step including directing a video input device to capture the image of the identified one of the plurality of speakers.

15. A program of instructions as claimed in claim 13, said adjusting step including adjusting a gain parameter of a microphone proximal to the identified one of the plurality of speakers.

16. A program of instructions as claimed in claim 10, wherein the conversation occurs during a meeting, the steps further comprising steps for generating minutes of the meeting, action items and an agenda for a subsequent meeting.

17. A program of instructions as claimed in claim 10, wherein the conversation occurs during a meeting, the steps further comprising steps for scheduling a subsequent meeting, providing an agenda for the subsequent meeting, providing a reminder of the meeting to the plurality of speakers, and providing an action item to each one of the plurality of speakers, the action item pertaining specifically to the corresponding one of the plurality of speakers.

18. The program of claim 10, the information including the identified speaker's name and at least one of the group consisting of the identified speaker's title, organization, and status.

19. An information handling system for memorializing a conversation of a plurality of speakers, comprising:

a processor for executing a program of instructions on the information handling system;

a memory, coupled to said processor, for storing the program of instructions executed by said processor; and a transducer, coupled to the information handling system and controlled by said processor, for converting utterances of the plurality of speakers into a signal interpretable by the information handling system wherein the information handling system generates a transcript of the conversation, the transcript including information associated with each of the utterances, the information regarding the corresponding speaker of each utterance, the information handling system interpreting the transcript of the conversation and generating a summary of the conversation based upon said interpreting the transcript.

20. An information handling system as claimed in claim 19, further comprising a display coupled to the information handling system for displaying the transcript.

21. An information handling system as claimed in claim 19, said transducer including a microphone.

22. An information handling system as claimed in claim 19, said transducer being a camera.

23. An information handling system as claimed in claim 19, further comprising a printer coupled to the information handling system for printing the transcript.

24. An information handling system as claimed in claim 19, further comprising a network for coupling the information handing system to an additional information handling system, the additional information handling system being capable of receiving the transcript over said network.

25. The information handling system of claim 19, information including the corresponding speaker's name and at least one of the group consisting of the corresponding speaker's title, organization, and status.

26. An information handling system for memorializing a conversation of a plurality of speakers, comprising:

means for executing a program of instructions on the information handling system;

means, coupled to said executing means, for storing the program of instructions executed by said executing means; and means, coupled to the information handling system and controlled by said executing means, for converting utterances of the plurality of speakers into a signal interpretable by the information handling system wherein the information handling system generates a transcript of the conversation, the transcript including information associated with each of the utterances, the information regarding the corresponding speaker of each utterance, the information handling system interpreting the transcript of the conversation and generating a summary of the conversation based upon said interpreting the transcript.

27. An information handling system as claimed in claim 26, further comprising means, coupled to the information handling system, for displaying the transcript.

28. An information handling system as claimed in claim 26, said converting means including a microphone.

29. An information handling system as claimed in claim 26, said converting means being a camera.

30. An information handling system as claimed in claim 26, further comprising means, coupled to the information handling system, for printing the transcript.

31. An information handling system as claimed in claim 26, further comprising means for coupling the information handing system to an additional information handling system, the additional information handling system being capable of receiving the transcript over said coupling means.

32. The information handling system of claim 26, the information including the corresponding speaker's name and at least one of the group consisting of the corresponding speaker's title organization, and status.

* * * * *